United States Patent
Patwari et al.

(10) Patent No.: US 8,818,288 B2
(45) Date of Patent: Aug. 26, 2014

(54) STATISTICAL INVERSION METHOD AND SYSTEM FOR DEVICE-FREE LOCALIZATION IN RF SENSOR NETWORKS

(75) Inventors: Neal Patwari, Salt Lake City, UT (US); Anthony Joseph Wilson, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 70 days.

(21) Appl. No.: 13/178,295

(22) Filed: Jul. 7, 2011

(65) Prior Publication Data

US 2012/0009882 A1    Jan. 12, 2012

Related U.S. Application Data

(60) Provisional application No. 61/363,107, filed on Jul. 9, 2010.

(51) Int. Cl.
    *H04B 17/00* (2006.01)
(52) U.S. Cl.
    CPC ........ *H04B 17/0072* (2013.01); *H04B 17/0062* (2013.01); *H04B 17/0057* (2013.01)
    USPC ...................................... 455/67.11
(58) Field of Classification Search
    CPC ...................................... H04B 17/00
    USPC ...................... 455/67.11, 10, 115.3; 342/451, 342/463–465, 174
    See application file for complete search history.

(56) References Cited

U.S. PATENT DOCUMENTS

| | | |
|---|---|---|
| 5,604,806 A | 2/1997 | Hassan |
| 6,301,324 B1 | 10/2001 | Pearson |
| 6,442,392 B2 | 8/2002 | Ruutu |
| 6,553,120 B1 | 4/2003 | Vaudenay |
| 6,744,253 B2 | 6/2004 | Stolarczyk |
| 7,064,660 B2 | 6/2006 | Perkins |
| 7,075,424 B1 | 7/2006 | Sundaresan |
| 7,307,575 B2 | 12/2007 | Zemany |
| 7,317,419 B2 * | 1/2008 | Sugar et al. ................. 342/464 |

(Continued)

FOREIGN PATENT DOCUMENTS

| | | |
|---|---|---|
| WO | WO2009033001 | 3/2009 |
| WO | WO2010030956 | 3/2010 |

OTHER PUBLICATIONS

International Search Report for PCT/US2009/056718, mailed Aug. 26, 2010.
Written Opinion for PCT/US2009/056718, mailed Aug. 26, 2010.

(Continued)

*Primary Examiner* — Andrew Wendell
*Assistant Examiner* — Maryam Soltanzadeh
(74) *Attorney, Agent, or Firm* — Workman Nydegger

(57) ABSTRACT

A new methodology for detecting, localizing, tracking, and counting objects. The method for state/space estimation includes arranging in a space a first pair of radio frequency sensors in a network of nodes. The first pair of radio frequency sensors is calibrated to determine a first fading condition associated with the first pair of radio frequency sensors. A signal strength of at least one signal sent between the first pair of nodes is measured. A first likelihood model is determined based on the first fading condition. A first posterior distribution is estimated based on the signal strength of the at least one signal using the first likelihood model for purposes of determining object information within the space.

23 Claims, 13 Drawing Sheets

(56) References Cited

U.S. PATENT DOCUMENTS

| | | | |
|---|---|---|---|
| 7,570,063 B2 | 8/2009 | Van Veen | |
| 7,856,656 B1 | 12/2010 | Kharvandikar | |
| 7,890,060 B2 * | 2/2011 | Lehtinen | 455/67.11 |
| 8,138,918 B2 * | 3/2012 | Habib et al. | 340/552 |
| 8,280,046 B2 | 10/2012 | Rudolf | |
| 8,502,728 B2 | 8/2013 | Joshi | |
| 8,503,673 B2 | 8/2013 | Patwari | |
| 8,515,061 B2 | 8/2013 | Patwari | |
| 2002/0089450 A1 | 7/2002 | Dowdle | |
| 2002/0168943 A1 | 11/2002 | Callaway | |
| 2003/0048223 A1 * | 3/2003 | Kezys | 342/368 |
| 2003/0064733 A1 | 4/2003 | Okanoue | |
| 2003/0117985 A1 | 6/2003 | Fujii | |
| 2003/0214410 A1 | 11/2003 | Johnson | |
| 2004/0170280 A1 | 9/2004 | Fekri | |
| 2004/0190718 A1 | 9/2004 | Dacosta | |
| 2005/0195109 A1 | 9/2005 | Davi | |
| 2005/0228902 A1 | 10/2005 | Lienhart | |
| 2005/0258988 A1 | 11/2005 | Jiang | |
| 2005/0285792 A1 | 12/2005 | Sugar | |
| 2006/0164298 A1 * | 7/2006 | Azuma | 342/368 |
| 2006/0193284 A1 | 8/2006 | Stieglitz | |
| 2007/0026935 A1 | 2/2007 | Wolf | |
| 2007/0035437 A1 | 2/2007 | Steinway | |
| 2007/0036353 A1 | 2/2007 | Reznik | |
| 2007/0060098 A1 | 3/2007 | McCoy | |
| 2007/0086489 A1 | 4/2007 | Carlson | |
| 2007/0165845 A1 | 7/2007 | Ye | |
| 2007/0177729 A1 | 8/2007 | Reznik | |
| 2008/0090572 A1 | 4/2008 | Cha | |
| 2008/0123851 A1 | 5/2008 | Guccione | |
| 2008/0169961 A1 | 7/2008 | Steinway | |
| 2008/0244094 A1 | 10/2008 | Rich | |
| 2009/0040952 A1 | 2/2009 | Cover | |
| 2009/0052663 A1 | 2/2009 | Hammond | |
| 2009/0141900 A1 | 6/2009 | Ye | |
| 2009/0161127 A1 | 6/2009 | Schweid | |
| 2009/0319819 A1 | 12/2009 | Haba | |
| 2010/0067701 A1 | 3/2010 | Patwari | |
| 2010/0207732 A1 | 8/2010 | Patwari | |
| 2010/0309051 A1 | 12/2010 | Moshfeghi | |
| 2011/0222421 A1 | 9/2011 | Jana | |
| 2011/0273321 A1 | 11/2011 | Joshi | |
| 2011/0280397 A1 | 11/2011 | Patwari | |
| 2012/0004889 A1 * | 1/2012 | Spiesberger | 702/181 |
| 2012/0009882 A1 | 1/2012 | Patwari | |
| 2012/0300864 A1 * | 11/2012 | Merlin et al. | 375/260 |
| 2013/0003077 A1 | 1/2013 | Suehira | |
| 2013/0011858 A1 * | 1/2013 | O'Connor et al. | 435/7.9 |

OTHER PUBLICATIONS

Zang Li, Wenyuan Xu, Rob miller, Wade Trappe, Securing Wireless Systems via Lower Layer Enforcements, Sep. 29, 2006, pp. 33-41.

Mathur, et al. "Radio-telepathy: Extracting a Secret Key from an Unauthenticated Wireless Channel" MboiCom, Sep. 14, 2008 ACM, pp. 128-139.

International Search Report For PCT/US2009/056751, mailed Apr. 15, 2010.

Written Opinion for PCT/US2009/056751, mailed Apr. 15, 2010.

Tadayoshi, Kohno et al., "Remote Physical Device Fingerprinting" *IEEE*, Apr. 2005, pp. 93-108.

Liran, Ma et al, "A Hybride Rogue Access Point Protection Framework . . . " *IEEE*, Apr. 2008, pp. 1894-1902.

International Search Report for PCT/US2009/056743, mailed Apr. 26, 2010.

Written Opinion for PCT/US2009/056743, mailed Apr. 26, 2010.

International Search Report for PCT/US2008/075369, mailed Apr. 8, 2009.

Written Opinion for PCT/US2008/075369, mailed Apr. 8, 2009.

U.S. Appl. No. 12/558,106, Jan. 23, 2012, Office Action.

U.S. Appl. No. 12/558,106, Sep. 6, 2012, Notice of Allowance.

U.S. Appl. No. 13/063,659, Dec. 3, 2012, Office Action.

U.S. Appl. No. 12/558,106, Dec. 12, 2012, Notice of Allowance.

U.S. Appl. No. 12/558,106, Mar. 4, 2013, Notice of Allowance.

U.S. Appl. No. 13/063,646, Feb. 22, 2013, Notice of Allowance.

U.S. Appl. No. 13/063,687, Apr. 15, 2013, Office Action.

U.S. Appl. No. 13/063,646, Apr. 5, 2013, Notice of Allowance.

U.S. Appl. No. 13/063,659, Apr. 22, 2013, Notice of Allowance.

U.S. Appl. No. 12/558,106, Apr. 15, 2013, Notice of Allowance.

U.S. Appl. No. 12/676,492, Aug. 8, 2013, Office Action.

U.S. Appl. No. 13/063,687, Mar. 21, 2014, Final Office Action.

\* cited by examiner (a) Mode Parameters (b) Decays for target in LOS (c) Decays for target off LOS (b) Particle positions after ten iterations.

(a) Particle positions after five iterations.

STATISTICAL INVERSION METHOD AND SYSTEM FOR DEVICE-FREE LOCALIZATION IN RF SENSOR NETWORKS

RELATED APPLICATIONS

The present application claims priority to and the benefit of U.S. Provisional Application No. 61/363,107, entitled "Statistical Inversion Method and System for Device-Free Localization in RF Sensor Networks," filed on Jul. 9, 2010, which is herein incorporated by reference in its entirety for all purposes.

BACKGROUND OF THE INVENTION

1. Field of Invention

The present invention relates to the field of radio frequency (RF) sensors. Specifically, the present invention relates to object detection, localization, tracking, and counting using state/space estimation techniques incorporating fading conditions between pairs of nodes in a network of nodes comprising RF sensors.

2. The Relevant Technology

There is a demand for object detection and tracking.

SUMMARY OF THE INVENTION

What is described in the present invention is a new methodology for detecting, localizing, tracking, and counting objects. Specifically, systems and methods for state/space estimation are disclosed as embodiments of the present invention. In accordance with one embodiment of the present invention, the method for state/space estimation includes arranging in a space a first pair of radio frequency sensors in a network of nodes. The first pair of radio frequency sensors is calibrated to determine a first fading condition associated with the first pair of radio frequency sensors. A signal strength of at least one signal sent between the first pair of nodes is measured. A first likelihood model is determined based on the first fading condition. A first posterior distribution is estimated based on the signal strength of the at least one signal using the first likelihood model for purposes of determining object information within the space.

A system for state/space estimation is also disclosed, in accordance with one embodiment of the present invention. The system includes a first pair of radio frequency sensors in a network of nodes arranged in a space. A signal strength collector is configured for collecting signal strength of at least one signal sent between the first pair of radio frequency sensors. A calibration module is configured for determining a fading condition associated with the first pair of radio frequency sensors. A likelihood selector is configured for determining a likelihood model based on said fading condition. An estimation module is configured for estimating a posterior distribution based on the signal strength of the at least one signal using said likelihood model for purposes of determining object information within the space.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Figure 1:
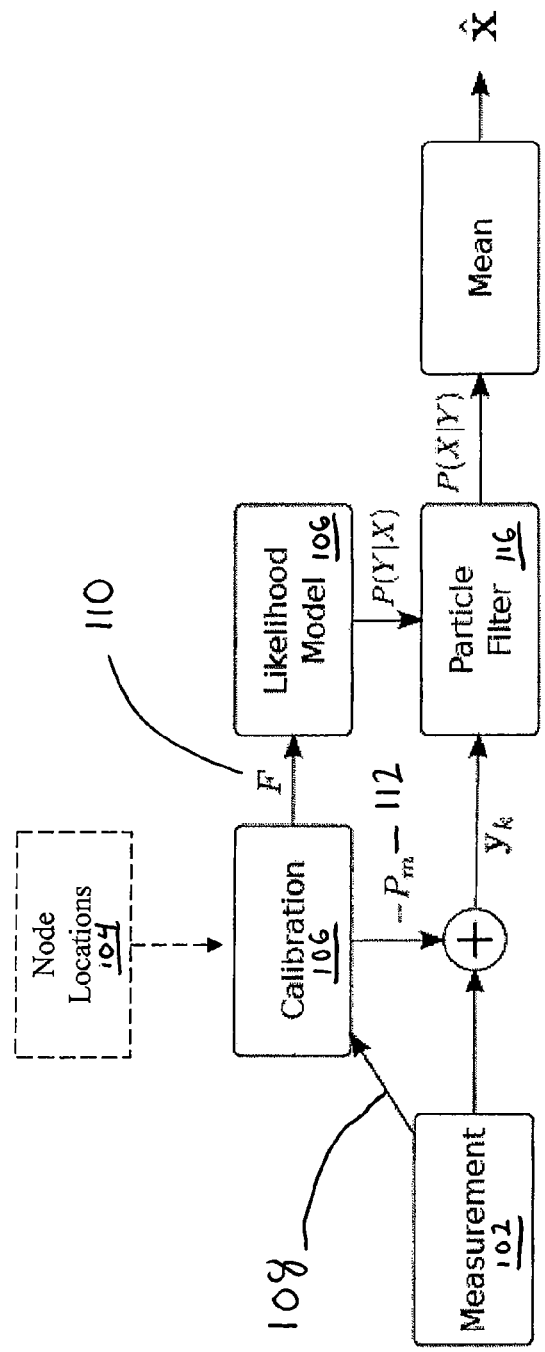
FIG. 1 is a system implementing a statistical inversion process for device free localization in wireless networks, in accordance with one embodiment of the present invention.

Reference will now be made in detail to the preferred embodiments of the present invention, a method and system for implementing a statistical inversion method for device-free localization in radio frequency (RF) sensor networks. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Related RSS-DFL Work

One approach to locating device-free entities in wireless networks is to use RSS fingerprinting, or radio maps. In this approach, the system is trained by a person standing at many pre-defined positions, and RSS measurements are recorded while the person stands at each location. When the system is in use, RSS measurements are compared with the known training data, and the closest matching position is selected from a list. The weakness of such a system is the need for manual training and maintenance. Measurements must be taken offline, and changes to the environment such as doors opening or moved furniture will corrupt the training. Furthermore, the training becomes exponentially difficult for localization of multiple targets.

Another approach to DFL is to estimate an image of the change in environment. This image can then be used to infer the motion and activity within the environment, either by a human operator, or by an image processing algorithm. Image estimation from measurements along different spatial filters through a medium is generally referred to as tomographic image reconstruction. For RF sensors, this is termed radio tomographic imaging (RTI). Another modality of RTI is variance-based RTI (VRTI), in which the windowed variance of RSS on each link is used as the measurement, and the estimated image represents a quantification of the motion within each voxel. However, major drawbacks of RTI and VRTI systems are that only objects in motion can be detected and tracked, and interference of obstructions in the environment (e.g., furniture, walls, etc.) that contribute to multi-path interference of received signals giving faulty readings. This may allow a person to evade these systems by either remaining motionless, or by moving very slowly. Embodiments of the present invention that implement the statistical inversion approach addresses this limitation, and can locate motionless humans in through-wall conditions.

Overview

Device-free localization is the estimation of the position of a target that does not carry any electronic device or tag. In embodiments, measurement-based statistical models can be used to estimate the locations of objects (e.g., people) using signal strength measurements in wireless networks. In addition, changes in signal strength measurements due to human motion can be modeled by the skew-Laplace distribution, as is demonstrated using extensive experimental data. In other embodiments, the parameters of the distribution are dependent on the position of object and on the amount of fading that a particular link experiences. A particle filter is applied using a skew-Laplace likelihood model to experimentally detect and estimate the location of moving and stationary targets. State/space estimation for detection and estimation of the location of moving and stationary targets is achieved through walls, in one embodiment. Experimental data show that state/space estimation can be achieved with accuracies greater than approximately one meter.

Knowing the locations of one or more objects is extremely valuable and useful. Global positioning systems (GPS), radio frequency identification (RFID) and real-time location systems (RTLS) have proven their value for locating targets with an attached device. Device-free localization (DFL) is the practice of locating people or objects when no tag or device is attached to the entity being located. DFL technologies are therefore useful in applications like security, where the people being tracked are not expected to cooperate with the system.

A statistical inversion method is disclosed in embodiments of the present invention for DFL in narrowband RF sensor networks. The statistical inversion method is effective in tracking objects located behind walls, in accordance with one embodiment of the present invention.

Throughout this Application, the term "people" may be used, but is intended to refer generally to objects. Other examples of objects include packages, stationary equipment, mobile equipment, etc.

Various sensor technologies can be used for the purposes of DFL. The most common form of a DFL sensor is the optical camera. Infrared and thermal cameras are also increasingly common in military and security applications. While these technologies are certainly valuable, visible light cameras depend on an external source of light. Furthermore, optical, thermal, and infrared sensors are hindered by opaque or insulating obstructions.

In embodiments of the present invention, there is an advantage to using radio frequency sensors to infer locations of objects (e.g., human individuals) instead of optical, thermal, and infrared sensors. RF waves have the ability to penetrate obstructions like walls, trees, and smoke. Thus, DFL systems that use RF sensors (RF-DFL) are capable of locating objects through walls, in poor-sight outdoor environments, or in a smoke-filled buildings. These capabilities have obvious value for military organizations, police forces, and firefighter and rescue operations.

The most common and widely used form of RF-DFL is ultra-wideband (UWB) radar. UWB systems work by producing a very fast pulse of RF energy and recording the amplitudes, time delays, and phases of the reflections caused by objects and people in the vicinity. Some UWB systems are monostatic, meaning the transmitter and receiver are incorporated into a single device. Others are multistatic, where a single pulse transmission may be received by multiple devices deployed throughout an area.

In embodiments of the present invention DFL systems use the received signal strength (RSSDFL) of links in narrowband RF sensor networks. The advantage to this approach lies in the fact that RF sensors capable of measuring signal strengths are ubiquitous and inexpensive. The cost of each node is orders of magnitude lower than a UWB device, so deploying a network with tens or hundreds of nodes is financially feasible in many applications. Furthermore, RSS measurements can be obtained from off-the-shelf devices like wireless networking routers, wireless sensor modules, and cell phones.

Each section of the present Application introduces its topic in more detail. For instance, an extensive measurement campaign relating positions of objects to changes in RSS is described. Also, a quantification of the role of fading on the temporal variation of RSS is described. Further, the modeling of temporal variation of RSS with the skew-Laplace distribution is described. In addition, parameters of the skew-Laplace distribution as relating to an object's location is described. Moreover, the application of the skew-Laplace DFL model in through-wall experiments using a particle filter is described.

Statistical Inversion Approach

A new statistical inversion method for RSS-DFL in wireless networks is disclosed in various embodiments of the present invention. One embodiment allows for detection of a target, direct estimation of a target's position, tracking of one or more targets, the ability to count targets, and the performance of accurate self-localization procedures, without the need to use radio tomographic images as an intermediate information layer. Another embodiment takes advantage of the uniqueness of each link in the RF sensor network, rather than assuming each link behaves identically when people are located near a link. That is, links experience drastically different behavior dependent on its fading channel realization.

The statistical approach addresses some key limitations that existed in previous work. Since the new method does not rely on manual site-specific measurements, it can be deployed at multiple sites without the need for offline training in some embodiments. Furthermore, other embodiments of the present invention do not require a specific network location geometry or regularity in the environment. Also, in embodiments the statistical inversion approach is able to locate motionless objects in through-wall conditions.

FIG. 1 is a system 100 implementing a statistical inversion process for device free localization in wireless networks, in accordance with one embodiment of the present invention. As shown, raw measurements 102 are received at a base station processing unit. These raw measurements 102 are received signal strengths 108 of one or more signals sent between a network of RF sensor nodes.

These raw measurements 102 are optionally combined with knowledge about the node locations 104 to determine an amount of fading F 110 on each link, as well as a mean $P_m$ 112 of each link at a calibration module 106. This calibration information 110, 112 is used to determine a statistical likelihood model 114 based on the skew-Laplace distribution, as discussed below. The likelihood model 114 provides the basis for state/space estimation. In one embodiment, the likelihood model 114 provides the basis for a particle filter 116, a non-linear and non-Gaussian filter for recursive estimation, which is used to infer device-free location results.

Figure 10:
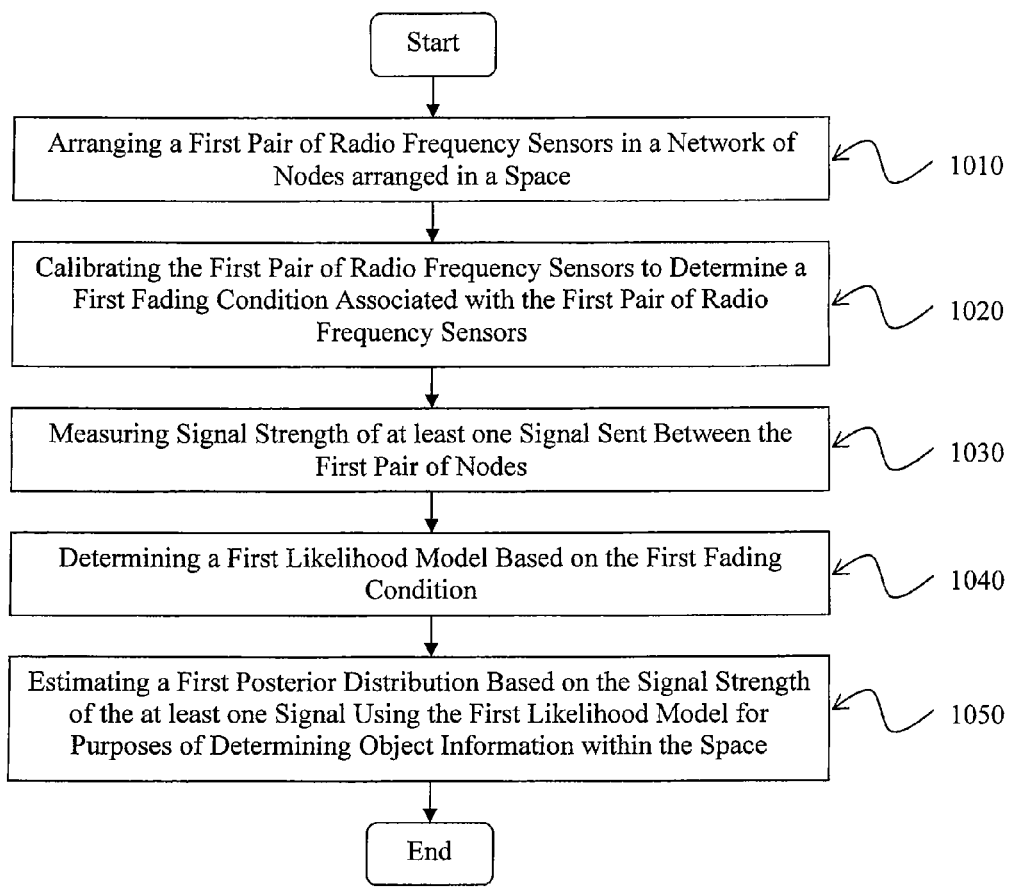
FIG. 10 is a flow chart illustrating a method for state/space estimation, in accordance with one embodiment of the present invention.

FIG. 10 is a flow chart illustrating a method for state/space estimation, in accordance with one embodiment of the present invention. The method illustrated in FIG. 10 can be implemented with the system 100 of FIG. 1, in one embodiment. As shown, at 1010, a first pair of RF sensors is configured in a network of nodes that is arranged in a space. At 1020, the first pair of RF sensors is calibrated to determine a first fading condition associated with the first pair of radio frequency sensors. At 1030, the signal strength of at least one signal sent between the first pair of RF sensors is measured. At 1040, a first likelihood model is determined based on the first fading condition. That this, calibration information is used to determine a statistical likelihood model based on the skew-Laplace distribution, in one implementation. At 1050, a first posterior distribution is estimated based on the signal strength of the at least one signal using the first likelihood model for purposes of determining object information within the space. That is, the first likelihood model provides the basis for particle filtering, a non-linear and non-Gaussian filter for recursive estimation, which is used to infer device-free location results.

Further, a second pair of RF sensors is configured in the network of nodes. The second pair of RF sensors is calibrated to determine a second fading condition associated with the second pair of RF sensors. The signal strength of at least one signal sent between the second pair of RF sensors is measured. A second likelihood model is determined based on the second fading condition. For instance, calibration information is used to determine a statistical likelihood model based on the skew-Laplace distribution. A second posterior distribution is estimated based on the signal strength of the at least one signal using the second likelihood model for purposes of determining object information within the space. For instance, the second likelihood model provides the basis for particle filtering, a non-linear and non-Gaussian filter for recursive estimation, which is used to infer device-free location results. More particularly, locations of sensors in the first and second pairs of RF sensors are determined. As such, a location of an object can be determined in relation to the locations of the sensors in the space based on the first and second posterior distributions.

Statistical Modeling

Figure 2:
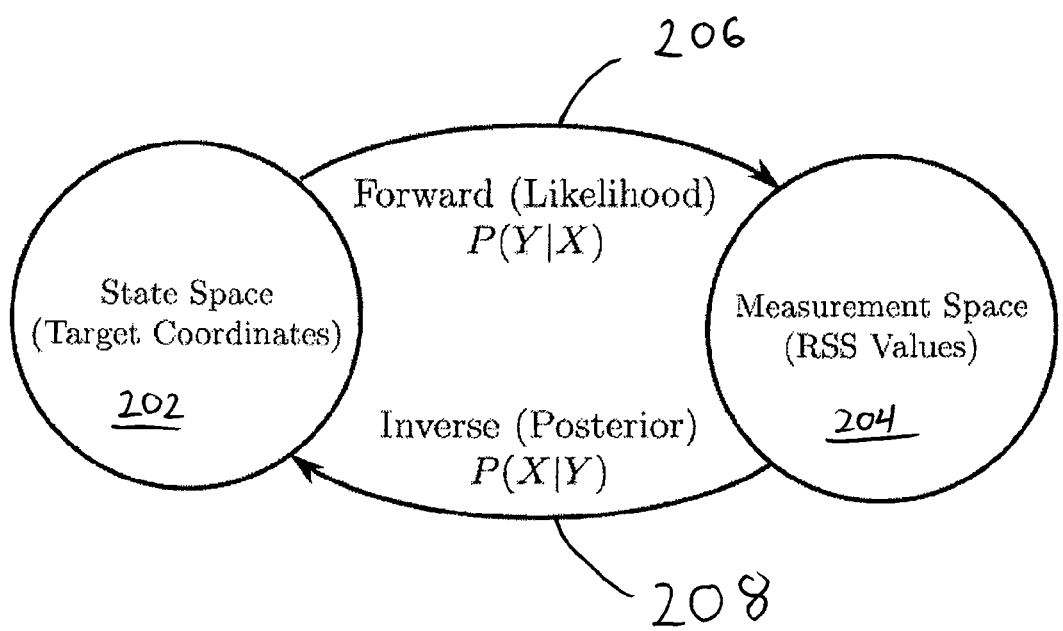
FIG. 2 is an illustration showing the role of likelihood and posterior distributions for statistical inversion, in accordance with one embodiment of the present invention.

In general, a statistical likelihood model 200 represents the noisy translation from a state space 202 to a measurement space 204, as is shown in FIG. 2, showing the role of likelihood distributions 206 and posterior distributions 208 for statistical inversion, in accordance with one embodiment of the present invention. Given a particular state, a certain distribution of measurements in the measurement space 204 will result. This can be thought of as a forward process, and the likelihood distribution P(Y|X) 206 defines it, where X is the state to be estimated, and Y is received or measured data. The inverse problem, therefore, involves taking measured data in the measurement space 204 and estimating the distribution of the state in the state space 202. The posterior distribution P(X|Y) 208 defines it, and it is found by applying Bayes' theorem, as follows.

$$P(X\mid Y)=\frac{P(Y\mid X)P(X)}{P(Y)}. \tag{1}$$

The state-space X is the coordinates, or the state space 202, of device-free entities within a wireless network, and the measurements Y are RSS values, or the measurement space 204, of each link in the network. Using the RSS measurements. the position of the targets is inferred by inverting the statistical model through the posterior distribution.

The likelihood function P(Y|X) 206, and the a priori knowledge of the state described in P(X), describes the statistical model that can be used to invert the problem. The position of targets affects the resulting RSS measurements, and affects statistics for different positions of the target. It is expected that a target standing on the line-of-sight (LOS) of a link causes significant changes to the RSS measurements 204, while a target at a distant position away from the LOS will not. The statistics for each "link-target geometry" are modeled in the likelihood functions 206, in accordance with embodiments of the present invention.

The a priori information P (X) can be used to incorporate known information about the targets. Since targets must move with finite velocity, this information allows an inversion algorithm to more accurately estimate positions over time. If the location of the targets movement is constrained by walls or other obstacles, the probability that the target will occupy those areas can be set to zero, in one embodiment.

Measurement Collection

To form a likelihood model, an experimental RF sensor network is deployed to capture RSS measurements. For instance, in one experimental implementation, network nodes consisted of 34 TelosB nodes from Crossbow, each utilizing the IEEE 802.15.4 protocol in the 2.4 GHz frequency band. A token passing protocol is used to prevent wireless packet collisions while maintaining low data collection latency.

The experimental network was deployed in two areas, one throughout the aisles of a bookstore, and one around the outer perimeter of a home. Both cases were rich in multipath, and no furniture or obstructions were removed from the areas in which the networks were deployed. In the bookstore deployment, nodes were placed on shelves and stands at approximately human waist level. Some links crossed through multiple aisles, and some were in direct LOS.

Figure 3:
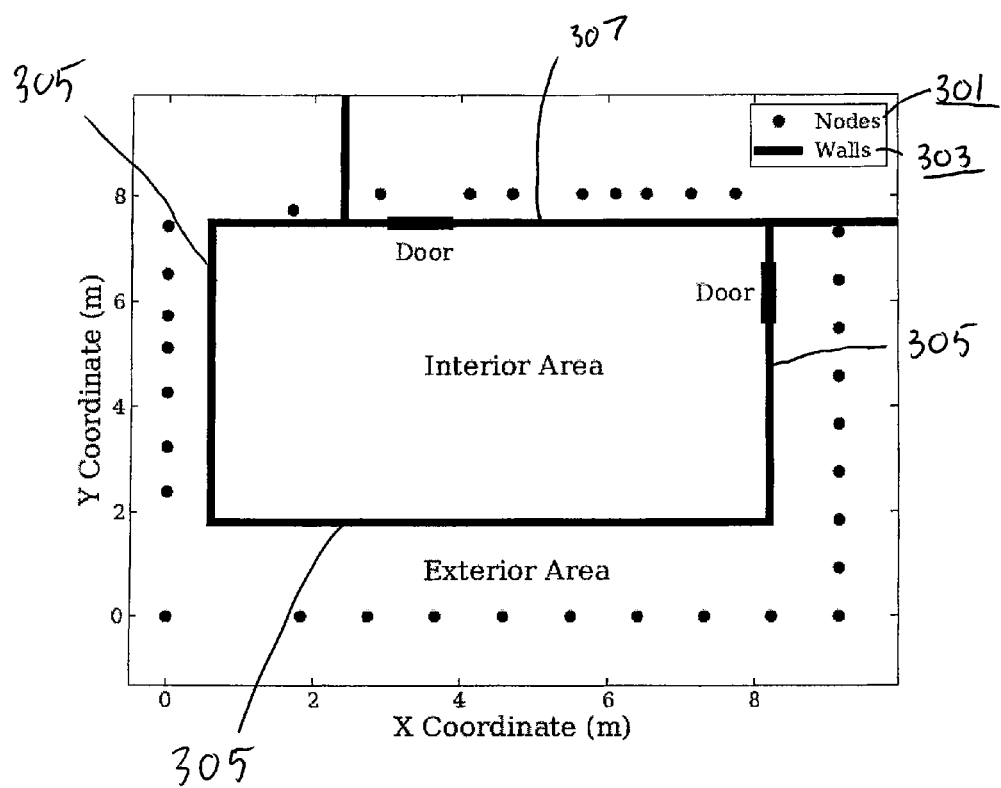
FIG. 3 is an illustration of a network of a plurality of radio frequency sensors arranged as a network of nodes in a 34 node through-wall wireless network deployment layout, in accordance with one embodiment of the present invention.

FIG. 3 illustrates the placement of nodes 301 of RF sensors in the outer home deployment in which the network was deployed in an area around a four-wall 303 portion of a typical home. Three of the walls are external walls 305, and one internal wall 307 is located on the interior of the home. The interior wall 307 is made of brick and was an external wall prior to remodeling of the home. Objects like furniture, appliances, and window screens (not illustrated) were not removed from the home to ensure that the tracking was functional in a natural environment.

The nodes 301 were placed in a rectangular perimeter, as depicted in FIG. 3, which illustrates the layout of a 34-node through-wall wireless network deployment. It was neither possible, nor necessary, to place the nodes 301 in a uniform spacing due to building and property obstacles (not illustrated). Eight of the nodes 301 were placed on the inside of the building, but on the other side of the brick interior wall 307.

To avoid network transmission collisions, a token passing protocol can be used. For instance, each node 301 is assigned an ID number and programmed with a known order of transmission. When a node 301 transmits, each node 301 that receives the transmission examines the sender identification number. The receiving nodes 301 check to see if it is their turn to transmit, and if not, they wait for the next node 301 to transmit. If the next node 301 does not transmit, or the packet is corrupted, a timeout causes each receiver to move to the next node 301 in the schedule so that the cycle is not halted. A base-station node 301 that receives all broadcasts is used to gather signal strength information and pass it to a laptop computer for processing.

RSS data was gathered as objects or humans walked near and through the networks. The location of each object was carefully tracked by placing markers on the ground. In this experimental case, the objects included persons. To keep each target moving at a constant velocity, an audible metronome was played over a speaker, allowing each person to step to the next marking at the correct time. Using this technique, millions of RSS measurements were gathered, along with their corresponding target positions.

In one embodiment, since likelihood models are based on changes in signal strength, a calibration process is used for each deployment. During calibration, RSS measurements for each link were taken while the network area was vacant of objects or people. Each link's RSS measurements were averaged and used to determine the change in RSS for modeling. Other embodiments allow for calibration in a more live condition, while the network area was populated with people.

Fading Information

People or objects moving near a wireless link will cause changes in RSS due to diffraction, shadowing, and fading. This temporal variation is different from small-scale or frequency selective fading that occurs due to relative motion between the transmitter and receiver in multipath environments. Instead, a subset of multipath components are affected by the presence of the object near the wireless link.

When the channel is predominantly LOS, such as in an open outdoor area, then a human, or more generally an object, crossing the LOS will generally cause a drop in signal strength due to signal shadowing. This phenomenon has been applied to image the attenuation of humans within a wireless network.

When an environment is rich in multipath and heavily obstructed, the presence of a human on the LOS of a link causes unpredictable changes in RSS. Sometimes the power may drop, sometimes it may not change at all, and sometimes it will rise.

It is important to note that the amount of fading on a link plays an important role in the resulting temporal variation statistics. Links that experience deep fades due to the natural multipath environment are more likely to experience a high variance of RSS when a person enters the vicinity, and will usually increase in power. On the other hand, links that constructively interfere vary much less, and usually decrease in power when disrupted. Constructively interfering situations are labeled as "anti-fades" and further described below.

Figure 4:
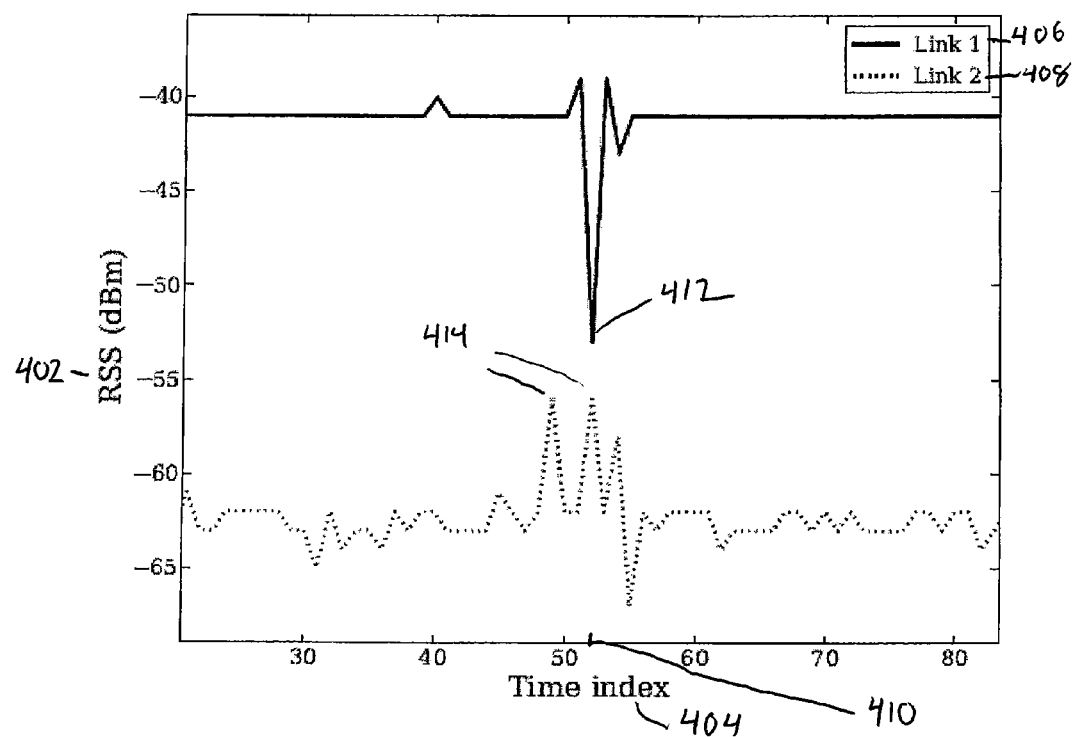
FIG. 4 illustrates an example of how the received signal strength (RSS) statistics for two links of equivalent distance and geometry are drastically affected by the fade level, in accordance with one embodiment of the present invention.

To further illustrate this phenomenon, an example of how RSS varies over time for two links of equivalent distance is shown in FIG. 4, which shows how RSS statistics are drastically affected by fade level. In FIG. 4, RSS 402 is plotted with the Y-axis indicating the RSS 402 and the X-axis indicating time 404. Since the path length and environment are the same, it is observed that in relative terms, the fading level is 20 dB different. Link 1 406 is considered to be in an anti-fade and link 2 408 to be in a deep fade. As a human walks through the LOS path of the two links 406, 408 at t=52 seconds 410, it is noted that the RSS 402 changes.

In the case where the link is in an anti-fade, such as link 1 406, very little variance is experienced when the person is not directly between the nodes. When the person crosses, the RSS 402 drops significantly since the link was already experiencing constructive multipath interference. Any disruption to the phases or amplitudes of the multipath would therefore bring the power down.

On the other hand, in the deeply-faded link, such as link 2 408 the opposite is true; any disruption to the link tends to bring the power up. In this example the RSS 414 generally increases while the human walks through the LOS, as seen in FIG. 4.

Quantification of Fade Level

The amount of fading occurring on a static link can be quantified by defining a "fade level." In a wireless channel, the ensemble mean P(d) (dBm) measured by the receiver is dependent on the distance d from the transmitter, as shown below in Eqn. 15.

$$P(d) = P_T - \Pi_0 - 10 n_p \log_{10} \frac{d}{\Delta_0} \qquad (2)$$

where $P_T$ is the transmitted power in dBm, $n_p$ is the path loss parameter, and $\pi_0$ is the loss measured at a short reference distance $\Delta_0$ from the transmitter.

In multipath environments, fading will cause a significant deviation from the prediction in the path loss equation. The fade level F (dBm) is quantified as the difference between the path loss prediction and the actual measured received power $P_m$ in dBm, and is shown in Eqn. 3.

$$F = P_m - P(d) \qquad (3)$$

Assuming the locations of each node are known or estimated in a wireless network, it is possible to calculate the fade level for each link. First, the power for each link is measured and averaged over an arbitrary time period to obtain $P_m$. Next, the path loss model is given the known distance of the link to determine P(d), based on a known path loss parameter and reference powers. The path loss parameter can also be estimated without prior knowledge by performing a fit using all measurements from the network.

Measurement and Modeling Results

Previously, no model existed for the statistics of temporal variation on a wireless link as a function of the static fade level. In one embodiment, to obtain such a model, each RSS measurement is binned according to its known fade level found during calibration. Histograms are examined for each bin of fade level. Additionally, RSS measurements are separated for when a person is located on the direct LOS path.

The distribution of RSS measurements when a person is on the LOS for low fade levels is found to have a heavier tail in the positive direction, while the distribution for high fade levels has a negative skew, in one embodiment. Histograms of the data are shown in FIGS. 5(a)-(d).

Figure 5:
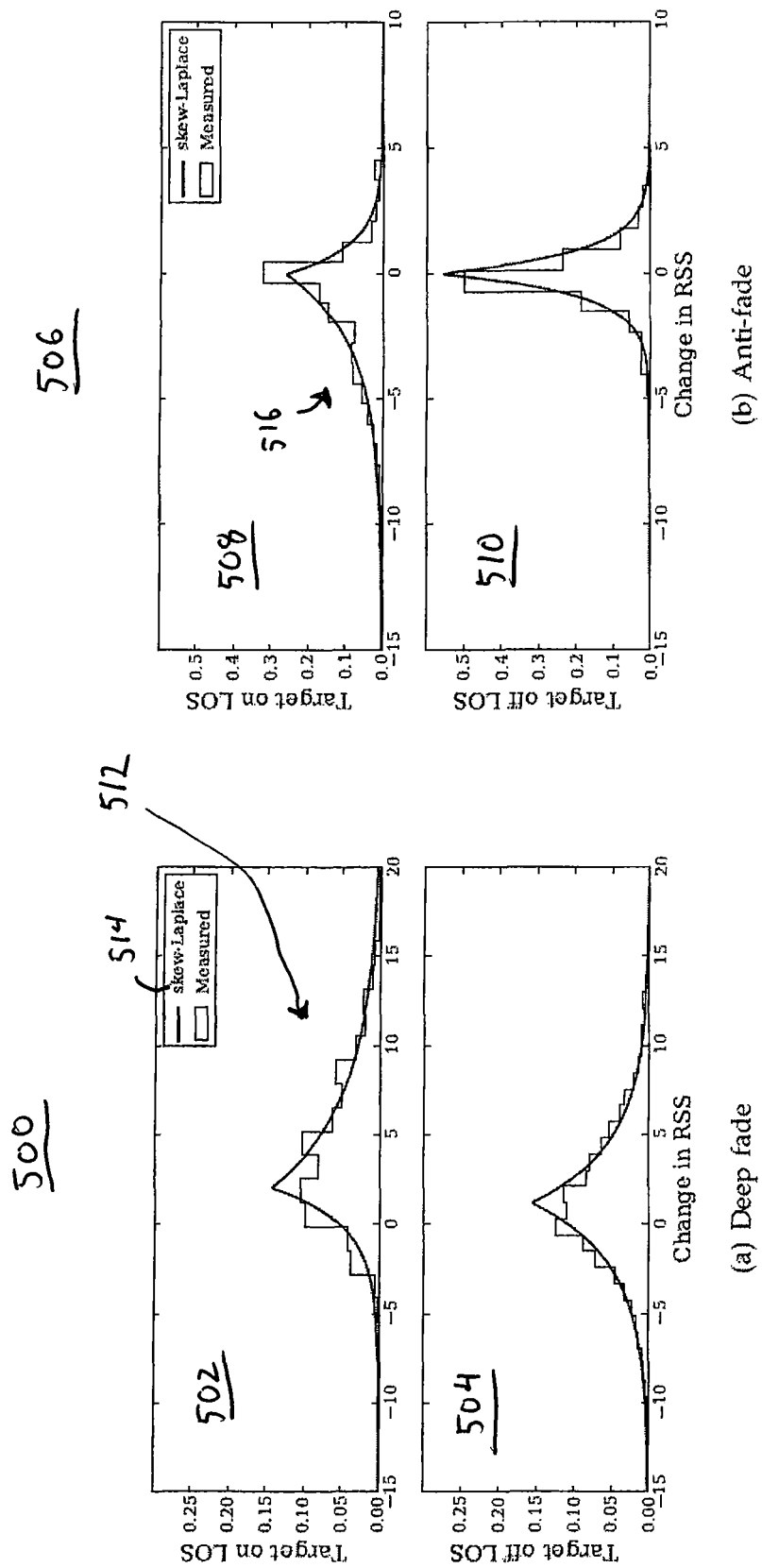
FIG. 5(a) is an illustration of RSS measurement distributions for on/off line-of-sight (LOS) target positions, and show histograms for links experiencing deep fades less than $-15$ dBm, in accordance with one embodiment of the present invention.
FIG. 5(b) is an illustration of RSS measurement distributions for on/off line-of-sight (LOS) target positions, and show histograms for links experiencing anti-fades greater than 10 dBm, in accordance with one embodiment of the present invention.
FIG. 5(c) is an illustration of quantile-quantile plots for links experiencing deep fades less than $-15$ dBm, in accordance with one embodiment of the present invention.
FIG. 5(d) is an illustration of quantile-quantile plots for links experiencing anti-fades greater than 10 dBm, in accordance with one embodiment of the present invention.
Figure 5:
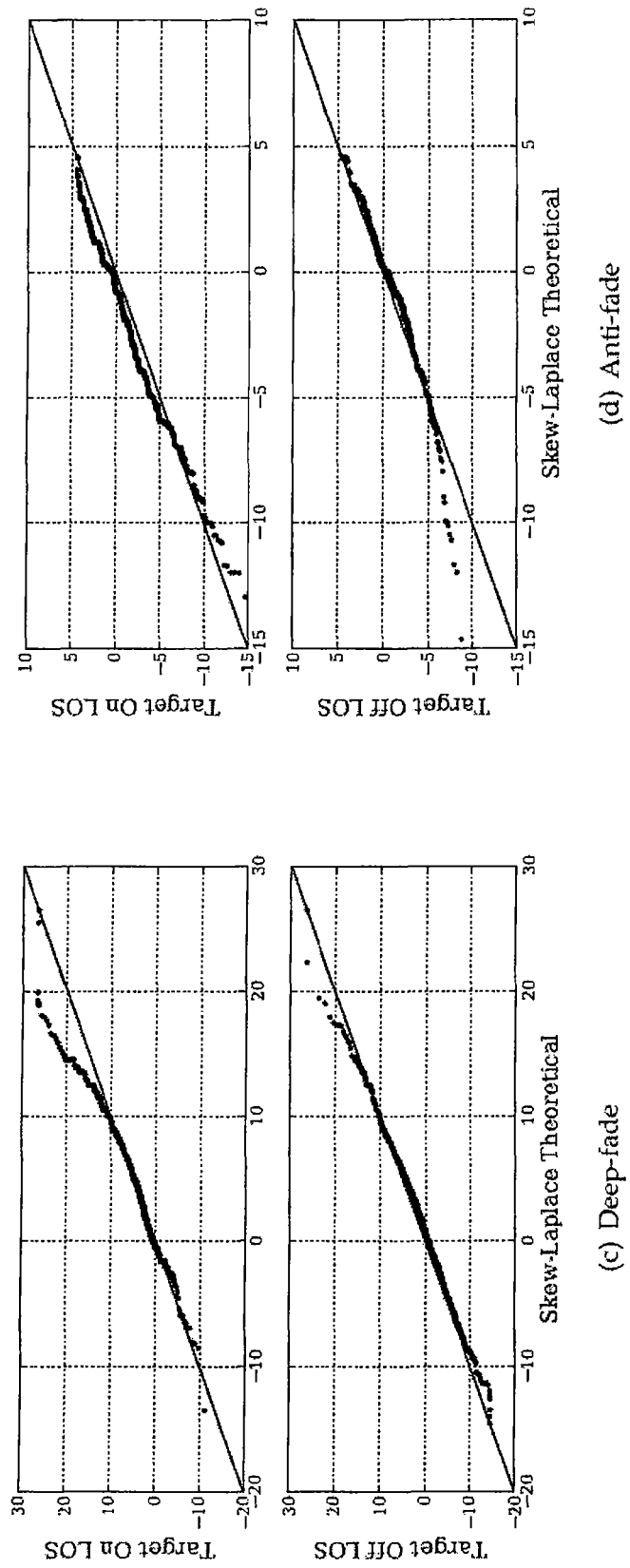

Specifically, FIG. 5(a) is an illustration of RSS measurement distributions 500 for on/off line-of-sight (LOS) target positions, and show histograms 502, 504 for links experiencing deep fades less than −15 dBm, in accordance with one embodiment of the present invention. FIG. 5(b) is an illustration of RSS measurement distributions 506 for on/off line-of-sight (LOS) target positions, and show histograms 508, 510 for links experiencing anti-fades greater than 10 dBm, in accordance with one embodiment of the present invention.

As shown in FIG. 5(a), for fading levels of −15 dBm and less, the decay on the positive side 512 of the skew-Laplacian 514 is much slower when a person is standing on the LOS path. On the other hand, as shown in FIG. 5(b) when the fade level is greater than 10 dBm, the tail present on the negative side 516 of the distribution 506 is longer. As such, when the target is not on the LOS path of the link, the variance of the distributions 500, 506 is significantly less. The data visualized by these histograms 502, 504 support the heuristic argument that links already in a deep fade should rise in power when disturbed, and vice versa.

With the understanding that the skew of the RSS distribution is dependent on the static fade level, a non-symmetric probability density function with both positive and negative support is desired. The skew-Laplace distribution fits the measurements surprisingly well in embodiments, as seen in the quantile-quantile plots of FIGS. 5(c) and (d). FIG. 5(c) is an illustration of quantile-quantile plots for links experiencing deep fades less than −15 dBm, in accordance with one embodiment of the present invention. FIG. 5(d) is an illustration of quantile-quantile plots for links experiencing anti-fades greater than 10 dBm, in accordance with one embodiment of the present invention. The skew-Laplace distribution is controlled by three parameters, and is defined in Eqn. 4.

$$f(x; a, b, \psi) = \frac{ab}{a+b} \begin{cases} e^{-a(\psi-x)} & \text{if } x \leq \psi \\ e^{-b(x-\psi)} & \text{if } x > \psi \end{cases} \quad (4)$$

where a and b represent one-sided decays of the distribution for values less than or greater to the mode. For the purposes of DFL, the values for each parameter of the skew-Laplace distribution is dependent on the fading level of the static link and the link-target geometry.

The RSS distributions shown in FIGS. 5(a)-(d) represent the two extreme fading cases. When a link is neither in a deep fade nor an anti-fade, the parameters of the distribution will fall between those of the extremes. In other words, the parameters of the likelihood model are dependent on the value of fade level. These parameters are approximately linear with the fade level, and as such, the least-squares criteria can be used to determine the line of best fit, in one embodiment. The linear fit equations are presented in Table 1.

TABLE 1

Linear parameter fitting for the skew-Laplace likelihood model

| | $\psi$ | a | b |
|---|---|---|---|
| LOS (F ≤ −6) | −3.85−.631F | .350 + .004F | .607 + .028F |
| LOS (F > −6) | 0.0 | .350 + .004F | .607 + .028F |
| Off LOS | 0.0 | .726 + .019F | .902 + .040F |

Figure 6A:
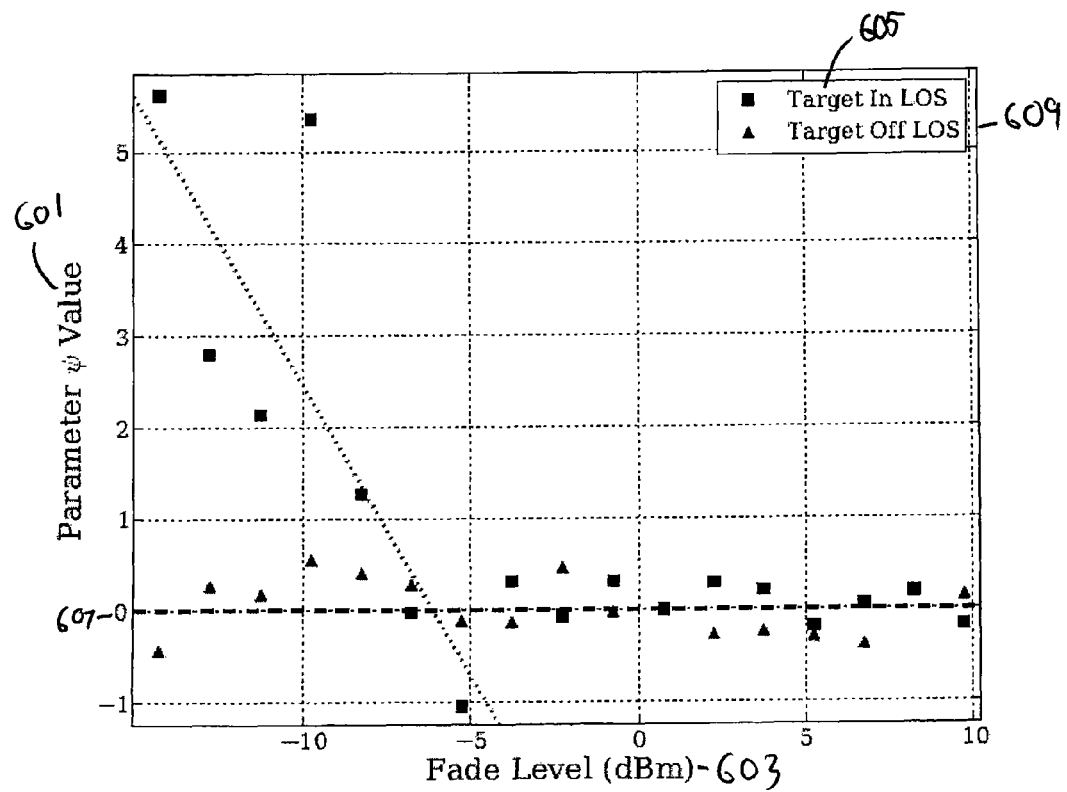
FIG. 6(a) is an illustration of parameter fitting for the skew-Laplace likelihood functions over a range of fade levels in dBm, and show mode parameters, in accordance with one embodiment of the present invention.

The mode parameter $\psi$ 601 for varying fade levels 603 is shown in FIG. 6(a). FIG. 6(a) is an illustration of parameter fitting for the skew-Laplace likelihood functions over a range of fade levels 603 in dBm, and show mode parameters 601, in accordance with one embodiment of the present invention. As shown, when the target is off the LOS path, the peak parameter 605 is near zero 607 for all values of the fade level 603. When the target is located on the LOS path, a piecewise-linear function can be used to approximate a parameter 609 for a given fade level 603.

Figure 6B:
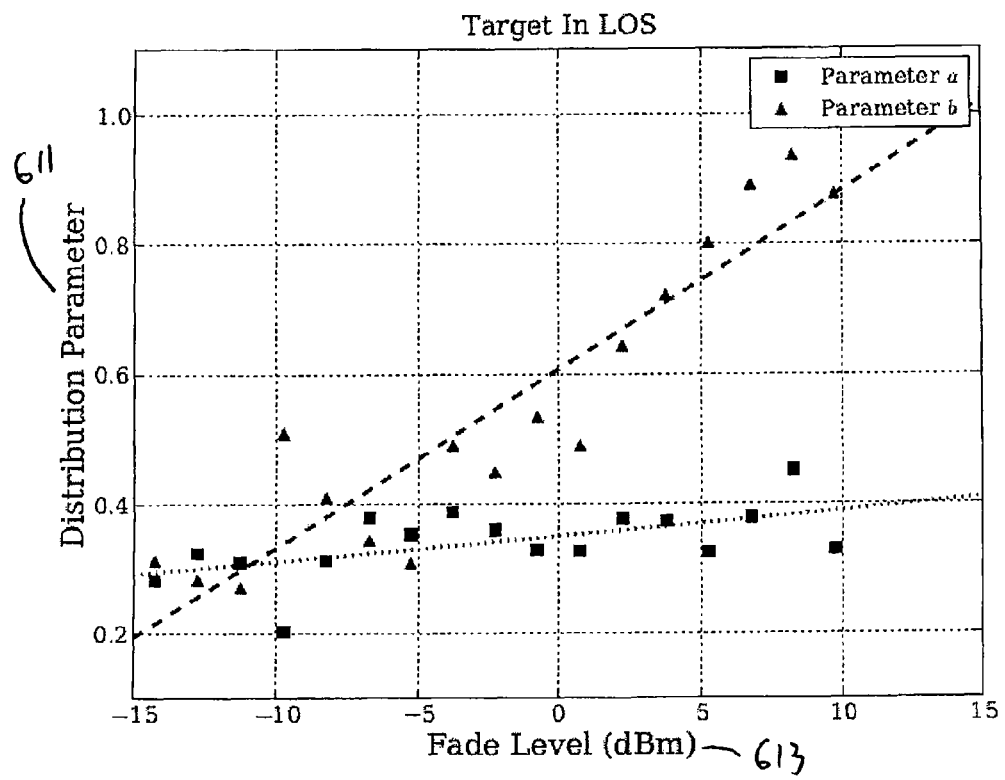
FIG. 6(b) is an illustration of parameter fitting for the skew-Laplace likelihood functions over a range of fade levels in dBm, and show decay parameters when the target is located on the LOS path of the link, in accordance with one embodiment of the present invention.
Figure 6C:
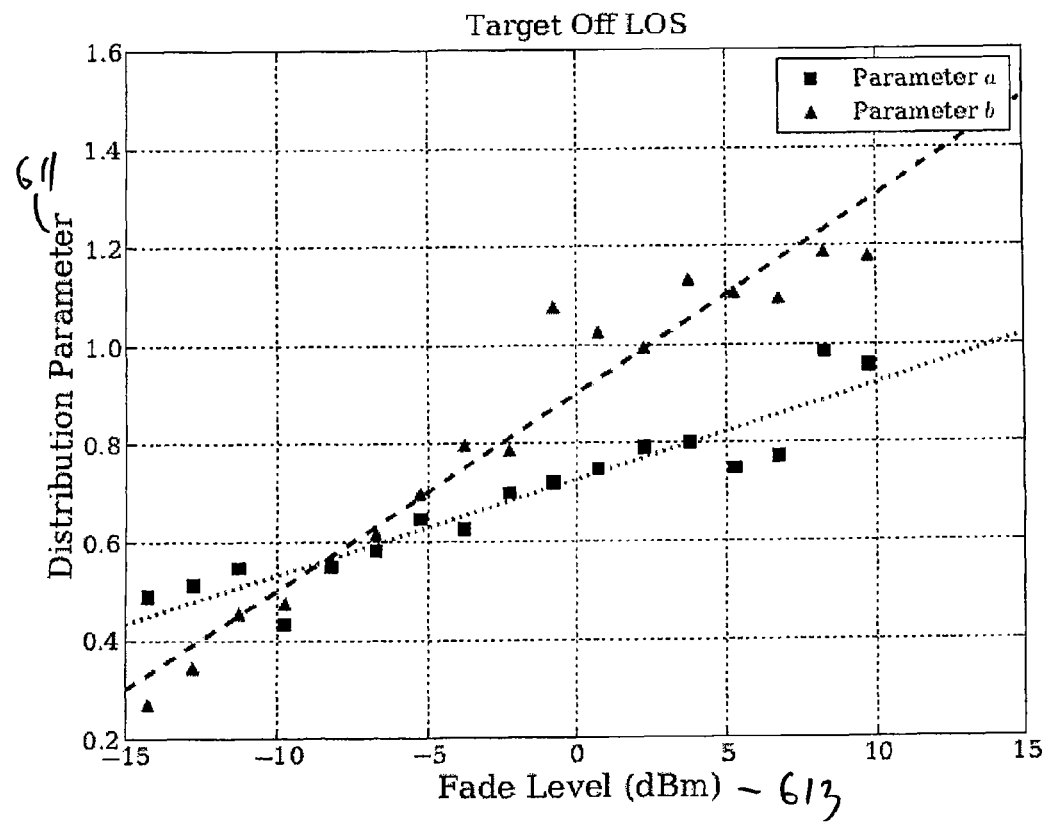
FIG. 6(c) is an illustration of parameter fitting for the skew-Laplace likelihood functions over a range of fade levels in dBm, and show decay parameters when the target is off the LOS path, in accordance with one embodiment of the present invention.

The decay parameters 611 for varying fade levels 613 are shown in FIG. 6(b) and FIG. 6(c). FIG. 6(b) is an illustration of parameter fitting for the skew-Laplace likelihood functions over a range of fade levels 613 in dBm, and show decay parameters 611 when the target is located on the LOS path of the link, in accordance with one embodiment of the present invention. FIG. 6(c) is an illustration of parameter fitting for the skew-Laplace likelihood functions over a range of fade levels 613 in dBm, and show decay parameters 611 when the target is off the LOS path, in accordance with one embodiment of the present invention. All parameters 611 can be approximated with a piecewise-linear function of the fade level 613. As shown, as the fade level 613 increases, the decay parameters 611 increase as well for both the on and off LOS cases. In other words, links that experience a deep fade 613 have higher variance than those that experience an anti-fade.

To summarize the model, the distribution of RSS measurements is dependent on the existence of the target on the LOS path, and on the static fade level of the link. The values for each of the different cases are presented in Table 1. The fade level, as discussed previously, can be computed by deploying a network before any targets have entered an area, or by processing measurements over time.

Particle Filtering

There are many frameworks for estimating a posterior distribution using likelihood models. For instance, Kalman filtering, in its multiple forms, is one framework used in one embodiment. In another embodiment, the particle filter is an attractive form of posterior estimation. There are many forms of the particle filter, including the auxiliary particle filter and the unscented particle filter.

There are a number of reasons why particle filtering is attractive for DFL in RF sensor networks. First, particle filters do not make any assumptions on linearity of the measurement process or the dynamics of the state being estimated. Since, implementation of likelihood models are dependent on the existence of a target on the LOS path of each link, this is an important flexibility. Furthermore, non-linear models for target movement can be incorporated directly into the particle framework.

Also, unlike the Kalman filter, the particle filter does not require the likelihood distributions to be Gaussian. This is extremely important for applying likelihood functions in the present embodiment, as they are well-modeled as skew- Laplacian. Assuming Gaussian distributions would be suboptimal, and may introduce significant tracking error.

Finally, the particle filter is attractive for real-time processing since incoming measurements can be used to update the posterior estimation without storing a history of previous measurements. As new measurements arrive, the algorithm recursively predicts and updates its estimation in a manner similar to that of the Kalman filter.

In one embodiment, a model that has a higher contrast for on-LOS distributions vs. the off-LOS distributions provides more accurate DFL tracking.

In another embodiment, a model explicitly accounts for multiple targets. In particular, as many people enter the area near a wireless link, interactions of the multipath components become more complex. The RSS measurement statistics of such a scenario are modeled, quantified, and then applied in an estimation framework similar to the particle filter to provide for multiple target tracking in DFL applications.

Particle Filter Algorithm

In the present implementation, each particle represents a particular hypothesized location coordinate of a target. Let $x_k$ be the true location of the target at time k, and let the set $\{\tilde{x}_k^i\}$ be the set of particles that represent hypotheses of target position. Let $\{w_k^i\}$ be the weights of each particle at time k, let $y_k$ be the current difference in RSS measurements for each link from the calibration data, and let $\hat{x}$ be the target location estimate.

In one embodiment, a sampling-importance-resampling (SIR) particle filter is used for experimentation, as presented below.

1) Measure: Receive new measurement vector $y_k$ from the network. Each element of the measurement vector represents an RSS measurement from each link in the network. This measured value is differenced with calibration data to determine the change in RSS.

2) Weight update: For each particle i=1, . . . , $N_p$, use the measurement vector $y_k$ to determine the updated weights.

Determine $p(y_k|\tilde{x}_k^i)$ using the skew-Laplace likelihood model with parameters found in Table 1. Fade levels are determined during calibration, as described previously.

Update weights with $w_k^i = w_{k-1}^i p(y_k|\tilde{x}_k^i)$.

3) Normalize the weights: $w_k^i = w_k^i / \Sigma_j w_k^j$.

4) Resample: particles with heavy weights are reproduced, particles with very low weights are eliminated.

5) Move the particles: Apply a Markov transition kernel to each particle. In one embodiment, the Metropolis-Hastings algorithm is used with a standard normal randomization.

6) Estimate: Average the particles to obtain the mean of the posterior distribution as the current state estimate.

In the algorithm described above, it is assumed that the particle filter proposal distribution $q(x_k|x_{k-1}, y_k)$ is equal to the Markov transition $p(\tilde{x}_k|x_{k-1})$, which leads to the weight update step. While this assumption makes for easy implementation, the efficiency of the particle filter is drastically reduced, since the current measurement is not used to propose new particle positions, in one embodiment.

Experimental Results

Results are presented in a through-wall tracking experiment utilizing the skew-Laplace likelihood models and particle filter. The same outer perimeter deployment discussed in FIG. 3 was used in the experiment.

In the experiments presented here, a calibration of RSS was taken while the surveillance area was vacant, in one embodiment. The calibration stage lasted for approximately 30 seconds, and all RSS values were averaged for each link over this period. Each incoming measurement was then compared with the calibration data to determine the change in RSS, as discussed in the modeling. The calibration measurement is also used to determine the fade level of each link. The system and method described in FIG. 1 provides a flow chart of the entire process described above.

Stationary Targets

A key benefit of the proposed models and algorithms is the ability to locate stationary objects behind walls, in embodiments of the present invention. As previously discussed, VRTI tracking systems are unable to locate stationary objects, since the algorithms rely on the variance caused by target motion. On the other hand, in embodiments of the present invention, the particle filter is able to locate stationary targets, especially when calibration data is available.

Figure 7:
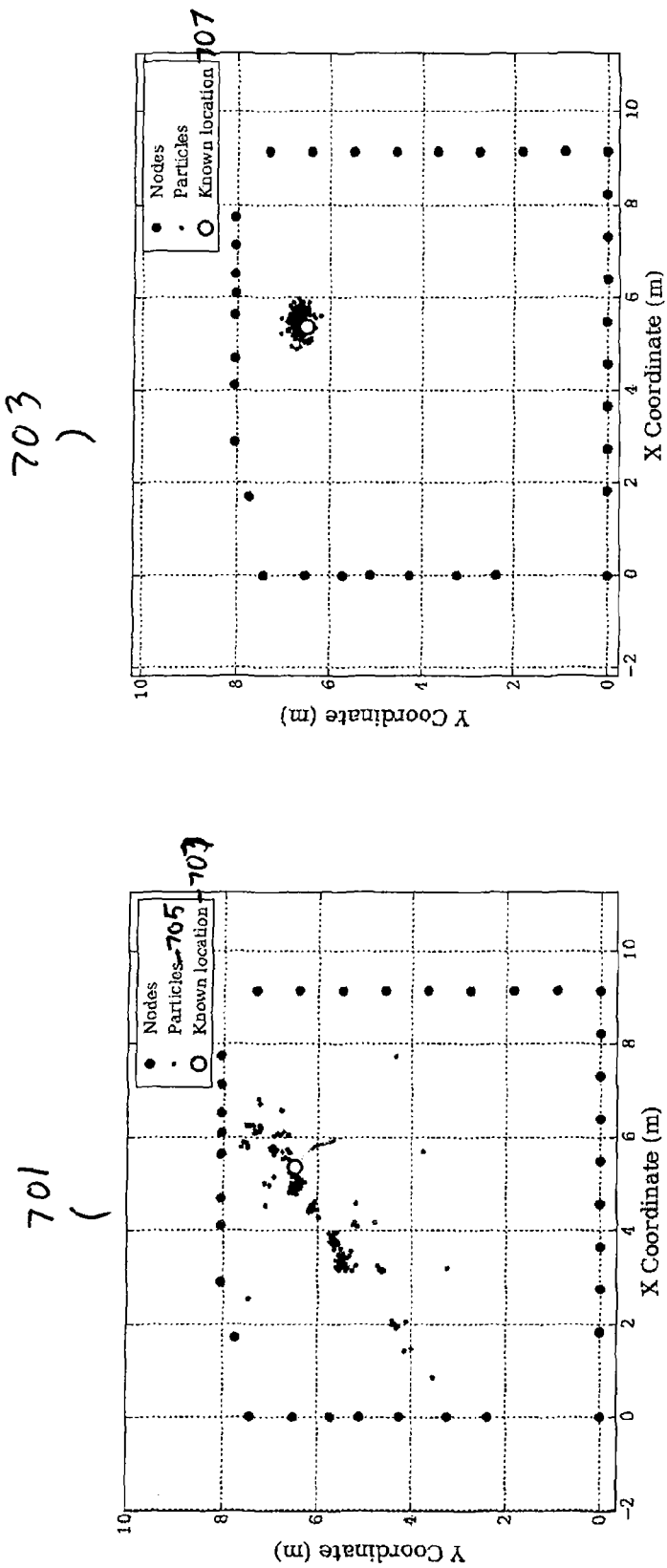
FIG. 7(a) is an illustration of the convergence of the particle filter over time, and more specifically after five iterations the filter has determined that the target is located along a particular LOS path, in accordance with one embodiment of the present invention.
FIG. 7(b) is an illustration of the convergence of the particle filter over time, and more specifically after ten iterations the filter has completely converged around a location of the target, in accordance with one embodiment of the present invention.

The convergence of the particle filter around a target is illustrated in FIG. 7, in accordance with one embodiment of the present invention. FIGS. 7(a) and 7(b) are illustrations 701, 703 of the convergence of the particle filter over time. As shown in FIG. 7(a), after five iterations, the filter has determined that the target position 707 is located along a particular LOS path. More specifically, particles 705 along a particular narrow area survive, while other areas are eliminated. This is because a particular link is reporting a statistically significant change in RSS, and the particle filter narrows its search to areas near that particular LOS. After ten iterations, as shown in FIG. 7(b), the particle filter has completely converged around the target's position 707.

Figure 8:
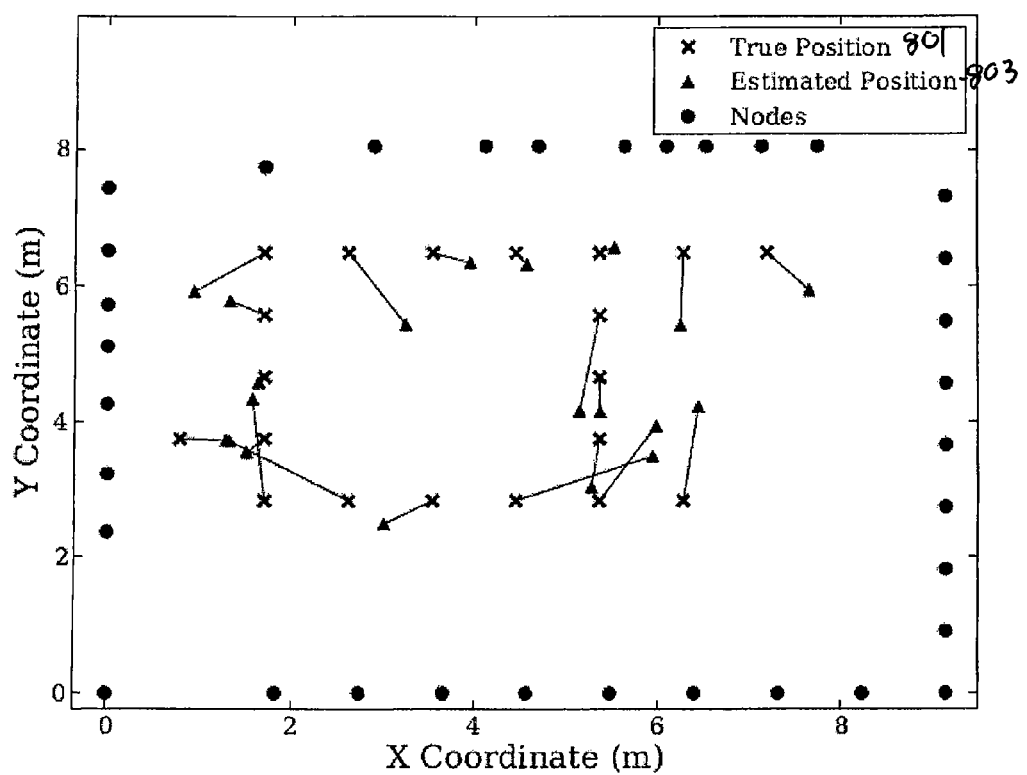
FIG. 8 is an illustration showing estimated positions of a stationary target at different positions, in accordance with one embodiment of the present invention.

To determine the accuracy of the statistical method for tracking stationary objects through-walls, 20 trials were performed. At each trial, a human target stood completely motionless at a different known location on the interior of the surveillance area. The known 801 and estimated 803 positions of a stationary target are shown in FIG. 8. In the present implementation, the estimated position 803 was taken after 50 iterations of a particle filter with 200 particles. The average error over the 20 trials was 0.83 meters.

Moving Targets

Figure 9:
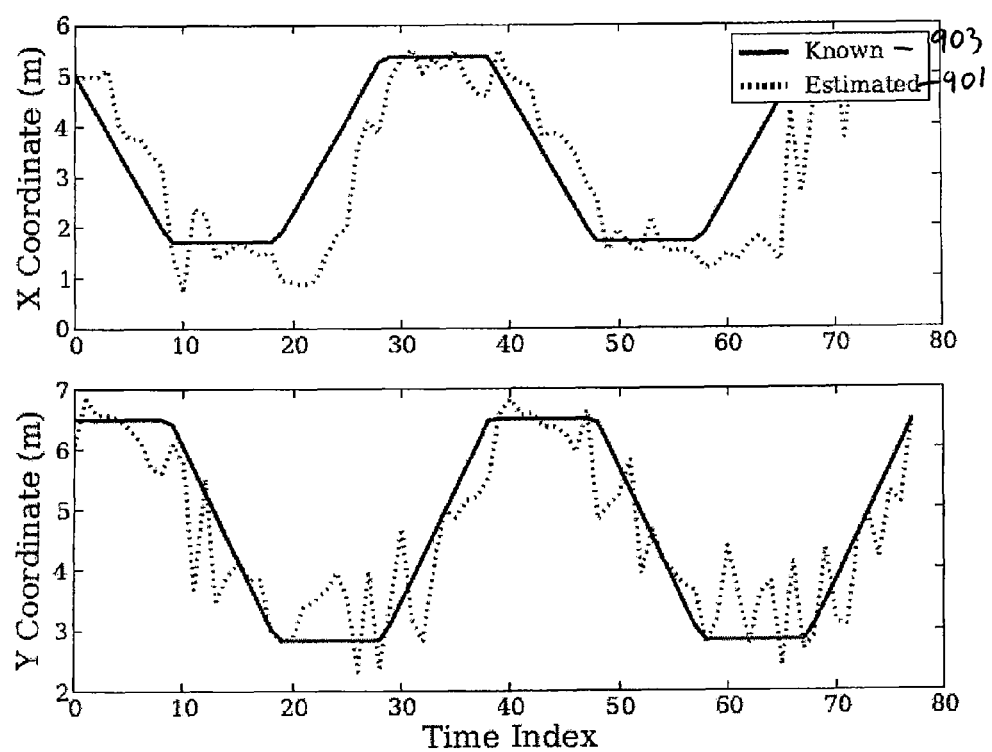
FIG. 9 is an illustration showing estimated positions of a human walking along a known path, in accordance with one embodiment of the present invention.

To test the accuracy of the above described methodology for tracking moving targets, during testing a human target moves at a typical walking pace on a pre-defined path at a constant speed. A metronome and uniformly placed markings on the floor help the person to take constant-sized steps at a regular time interval. The target's actual location is interpolated using the start and stop time, and the known marker positions. The results of the tracking are presented in FIG. 9, showing the estimated positions 901 of a human walking along a known path 903. In the present implementation, the particle filter uses 200 particles. The average error for this test was 1.02 meters.

In one embodiment, a particle filter is designed to take into account the true dynamics of a moving target for more accurate tracking. For instance, the particle filter is able to account for targets that tend to move in spurts of constant velocity.

CONCLUSION

Embodiments of the present invention provide a statistical model and inversion method that is capable of locating stationary as well as moving targets. In addition, the amount of fading on a static link is an important factor in determining the signal strength distributions when a target enters an area. If the link is already in a deep fade, the disturbance a target causes to the multipath will tend to bring the signal strength up. Links in deep fades also exhibit more variance, since even slight changes to multipath components can bring the link out of the fade. Links that experience anti-fades, however, exhibit the opposite behavior. Changes to the environment due to target presence tend to bring signal power down, and variances remain much lower.

Also, the skew-Laplace distribution is a reasonable representation of how RSS measurements change when a target is present. The mode and decay parameters of the distribution are dependent on the fade level of the link, as well as the target's position. When a target is on the LOS path of the link, RSS fluctuations are significantly larger than when the target is off-LOS. Each parameter, for both the LOS and off-LOS cases, is linear with the fade level.

Since the likelihood models are non-Gaussian and non-linear, the particle filter framework is an attractive way to estimate target positions using RSS measurements. Experiments using a particle filter and the skew-Laplace likelihood models demonstrate the method's effectiveness in locating stationary and moving targets behind walls.

A method and system for state/space estimation for purposes of detecting, localizing, tracking, and counting objects is thus described. While the invention has been illustrated and described by means of specific embodiments, it is to be understood that numerous changes and modifications may be made therein without departing from the sprit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method for state/space estimation, comprising:
   arranging a network of radio frequency sensors in a space, the network comprising a first pair of radio frequency sensors;
   calibrating said first pair of radio frequency sensors to determine a first fading condition associated with said first pair of radio frequency sensors;
   measuring signal strength of at least one signal sent between said first pair of radio frequency sensors;
   determining a first likelihood model based on said first fading condition, the likelihood model indicating a likelihood that a set of target coordinates will correspond to one or more measured received signal strength values;
   estimating a first posterior statistical distribution of measured received signal strength values based on said measured signal strength of said at least one signal using said first likelihood model, the first posterior statistical distribution comprising the inverse of the first likelihood model; and
   determining object information of one or more device-free objects within said space based on said first posterior statistical distribution of measured received signal strength values.

2. The method of claim 1, wherein determining the object information comprises detecting whether a device-free object is on or about a line-of-sight between said first pair of radio frequency sensors in said space based on said first posterior distribution.

3. The method of claim 2, wherein determining the object information further comprises tracking said device-free object based on said first posterior distribution.

4. The method of claim 1, wherein determining the object information comprises:
   determining locations of sensors in said first pair of radio frequency sensors; and
   determining a location of a device-free object in said space based on said first posterior distribution.

5. The method of claim 1, wherein calibrating said first pair of radio frequency sensors is partly based on said signal strength of said at least one signal.

6. The method of claim 1, further comprising:
   adjusting said signal strength of said at least one signal according to said calibration to obtain an adjusted signal strength; and
   estimating said first posterior distribution based on said adjusted signal strength of said at least one signal using said first likelihood model.

7. The method of claim 1, wherein the network further comprises a second pair of radio frequency sensors, the method further comprising:
   calibrating said second pair of radio frequency sensors to determine a second fading condition associated with said second pair of radio frequency sensors;
   measuring signal strength of at least one signal sent between said second pair of radio frequency sensors;
   determining a second likelihood model based on said second fading condition; and
   estimating a second posterior distribution based on said signal strength of said at least one signal using said second likelihood model; and
   wherein determining said object information of the one or more device-free objects is also based on said second posterior distribution.

8. The method of claim 7, wherein determining the object information comprises:
   determining locations of sensors in said first and second pairs of radio frequency sensors; and
   determining a location of a device-free object in said space based on said first and second posterior distributions.

9. The method of claim 8, wherein determining the locations of the sensors comprises:
   performing a self localization procedure in said network that incorporates said first and second fading conditions to determine locations of sensors in said first and second pairs of radio frequency sensors.

10. The method of claim 8, wherein determining the object information further comprises determining a second location of a second device-free object based on said first and second posterior distributions.

11. The method of claim 10, further comprising tracking said first and second device-free objects based on said first and second posterior distributions.

12. The method of claim 1, wherein estimating the first posterior distribution comprises applying a particle filter to estimate said first posterior distribution.

13. A system for state/space estimation, comprising:
   a first pair of radio frequency sensors, the first pair of radio frequency sensors being part of a network arranged in a space;
   a signal strength collector for collecting signal strength of at least one signal sent between said first pair of radio frequency sensors;
   a calibration module for determining a fading condition associated with said first pair of radio frequency sensors;
   a likelihood selector for determining a likelihood model based on said fading condition, the likelihood model indicating a likelihood that a set of target coordinates will correspond to one or more measured received signal strength values; and
   an estimation module for estimating a first posterior statistical distribution of measured received signal strength values based on said measured signal strength of said at least one signal using said likelihood model, the first posterior statistical distribution comprising the inverse of the first likelihood model, for purposes of determining object information of one or more device-free objects within said space.

14. The system of claim 13, wherein said estimation module determines as said object information if a device-free object is present on or about a line-of-sight between the first pair of radio frequency sensors.

15. The system of claim 14, wherein said estimation module determines as said object information motion of said device-free object based on said first posterior distribution.

16. The system of claim 13, further comprising:
a node locater for determining locations of sensors in said first pair of radio frequency sensors in said space; and
wherein said estimation module determines as said object information a location of said device-free object based on said first posterior distribution.

17. The system of claim 13, wherein said calibration module calibrates said first pair of radio frequency sensors based partly on said signal strength of said at least one signal.

18. The system of claim 13, further comprising:
a second pair of radio frequency sensors, the second pair of radio frequency sensors being part of said network;
wherein said signal strength collector collects signal strength of at least one signal sent between said second pair of radio frequency sensors;
wherein said calibration module determines a second fading condition associated with said second pair of radio frequency sensors;
wherein said likelihood selector determines a second likelihood model based on said second fading condition; and
wherein said estimation module estimates a second posterior distribution based on said signal strength of said at least one signal sent between said second pair of radio frequency sensors for purposes of determining said object information of the one or more device-free objects.

19. The system of claim 13, further comprising:
a node locater for determining locations of sensors in said first and second pairs of radio frequency sensors in said space; and
wherein said estimation module determines a location of a device-free object in said space based on said first and second posterior distributions.

20. The system of claim 13, wherein said network comprises a wireless network.

21. The method of claim 1, wherein the one or more device-free objects for which object information is determined comprises one or more persons.

22. The method of claim 1, wherein the network is a narrowband radio frequency network.

23. The system of claim 13, wherein the radio frequency sensors are narrowband radio frequency sensors.

* * * * *

UNITED STATES PATENT AND TRADEMARK OFFICE
CERTIFICATE OF CORRECTION

PATENT NO. : 8,818,288 B2
APPLICATION NO. : 13/178295
DATED : August 26, 2014
INVENTOR(S) : Patwari et al.

Page 1 of 1

It is certified that error appears in the above-identified patent and that said Letters Patent is hereby corrected as shown below:

In the Specification

Column 1
Line 13, Insert new paragraph with heading --GOVERNMENT LICENSE RIGHTS This invention was made with government support under ECCS0748206 awarded by National Science Foundation. The government has certain rights in the invention.--

Signed and Sealed this
Twenty-fourth Day of February, 2015

Michelle K. Lee
*Deputy Director of the United States Patent and Trademark Office*